(No Model.)
C. H. BRAITHWAITE.
GRASS RECEPTACLE FOR LAWN MOWERS.
No. 402,227. Patented Apr. 30, 1889.
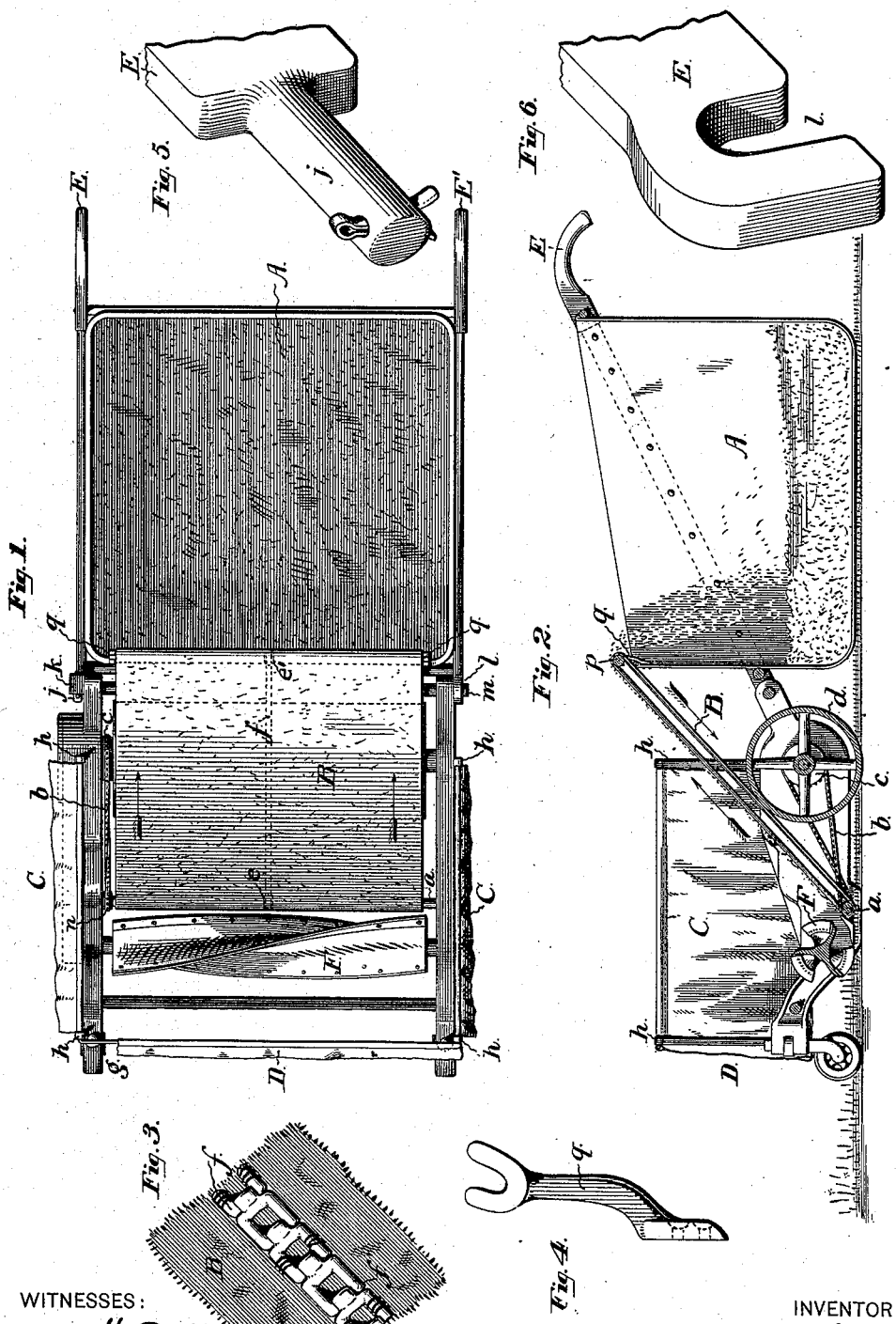
WITNESSES:
James H. Bell
John Wilson Jr
INVENTOR
Charles H. Braithwaite
by his atty
Henry N. Paul Jr

UNITED STATES PATENT OFFICE.

CHARLES H. BRAITHWAITE, OF ARDMORE, PENNSYLVANIA.

GRASS-RECEPTACLE FOR LAWN-MOWERS.

SPECIFICATION forming part of Letters Patent No. 402,227, dated April 30, 1889.

Application filed September 27, 1888. Serial No. 286,527. (No model.)

*To all whom it may concern:*

Be it known that I, CHARLES H. BRAITHWAITE, of Ardmore, in the State of Pennsylvania, have invented a certain new and useful Improvement in Lawn-Mowers, of which the following is a specification, reference being had to the accompanying drawings.

In the drawings, Figure 1 is a lawn-mower provided with my attachment as viewed from directly above. Fig. 2 is a sectional side view of the same. Figs. 3, 4, 5, and 6 show small parts in detail.

My invention applies to lawn-mowers provided with a grass-receptacle, and has reference to a means of conducting into the receptacle the bits of grass which have been cut off and a means of utilizing all the draft which is produced by the revolution of the cutting-blades for the purpose of aiding the gathering up of the bits of grass and their deposit in the receptacle for them. It also provides a very convenient form of receptacle and one which may very readily be emptied of its contents.

Figs. 1 and 2 show a lawn-mower of a common type; but my invention with very little modification is capable of being applied to any of the various forms now in use. The form shown has two separate handles, E and E'. Between them is shown the receptacle A. This is most conveniently made of canvas stretched upon a wire frame; but its construction is immaterial.

The cutting-blades of the mower are shown at F. Immediately behind these I place a small roller, a. This is caused to revolve in the direction opposite to that of the blades by means of a crossed endless chain, b, engaging the points of two sprocket-wheels, the smaller, n, situated at one end of the roller a, and the larger, c, upon the corresponding end of the axle which carries the main supporting-wheel d of the mower. Another roller, p, similar in size to the roller a, is situated near the front upper edge of the grass-receptacle. This is supported by two bearing-brackets, q q, (shown in detail in Fig. 4,) from which it may readily be detached for the purposes hereinafter mentioned. Around these two rollers a and p runs a broad endless band, B, of canvas or any other material having a sufficiently rough surface. This band derives its revolution from the roller a. In order to prevent its slipping around this roller, there is stitched to its inner side a chain, f, Figs. 1 and 3. This chain engages with sprocket-wheels—one upon the roller a at e, the other upon the roller p at e'. This chain also prevents the band from working sidewise as it revolves around the rollers. Where a mower is being used on a sloping lawn or terrace, one side of it may be for some time lower than another. It is therefore very advisable to have some such device as this to prevent the band from working to one side.

The operation of this part of my device is as follows: When the machine is set in motion, the forward revolution of the wheel d communicates, through the crossed chain b, a backward revolution to the roller a and causes a continuous upward motion of the upper surface of the band B. As the grass is cut by the blades F, the short bits which have been cut off fall upon this revolving band and are carried by it upward and over the roller p. Here they fall off of their own weight into the grass-receptacle A. In order that all the grass which is cut may fall upon the band B, it is necessary to utilize to the fullest possible extent the draft which is produced by the revolution of the blades F, acting as fans. To this end I fasten to the four corners of the lower part of the machine four uprights, h h h h. Across from the upper ends of these I hang three curtains—one, D, in front, and two, C C, at the sides. It is advisable that a slight vertical opening, g, be left between one side of the curtain D and the corner of the machine, in order that the person who is running the machine may follow the line of the grass which has been cut. These curtains shut out all air or wind from the vicinity of the blades of the mower except that which passes under the lower edge of the curtain D, which does not quite reach to the ground. The forward motion of the machine causes a continuous draft to pass under this curtain. The action of the blades as they revolve fans this draft up along the upper surface of the band B, carrying with it all of the bits of grass which have been cut. I furthermore provide a convenient means of dumping the grass which is thus collected in the receptacle. The sides of the latter are firmly fastened to the handles E E'. One of these, E, terminates in a cylindrical rod, $j$, which forms an axle, which passes through the collar $k$ at one of the rear corners of the cutting part of the machine. It is thus capable of revolving upon itself. The other, E', terminates in the hook-shaped end $l$, which fits over a pin, $m$, situated at the opposite rear corner from the collar $k$. The handles are firmly bound together by cross-rods as well as by the receptacle between them. When the receptacle becomes full of grass, the roller $p$ is removed from its bearings in the brackets $q$, the handle E' is pulled upward from its rest upon the pin $m$, and, together with the receptacle A, revolves upon the handle E as an axle until the receptacle is overturned and emptied of its contents.

Having thus described my invention, I claim—

1. In a lawn-mower, the combination of the grass-receptacle A, the endless band B, traveling from near the edge of the blades of the mower to the receptacle, and the curtains C D C, surrounding the front and sides of the blades, substantially as set forth.

2. In a lawn-mower, the combination of curtains C C, hung on either side of the cutting part thereof, and the curtain D, hung in front of the same, substantially as set forth.

3. A lawn-mower having uprights $h\ h\ h\ h$ at the four corners thereof and curtains C D C upon the uprights and surrounding the front and sides of the blades.

4. In a lawn-mower, the combination of the grass-receptacle A and the handles E E', fastened thereto at the sides, one of which, E, is swiveled at its forward end to the mower-frame, and the other of which, E', is detachably connected at its forward end to the mower-frame, whereby it is capable of being lifted from its fastening to overturn the receptacle on the other handle, substantially as set forth.

CHARLES H. BRAITHWAITE.

Witnesses:
JAMES H. BELL,
EDWARD FELL LUKENS.